United States Patent [19]

Murib et al.

[11] 3,758,551

[45] Sept. 11, 1973

[54] PROCESS FOR THE PREPARATION OF ACRYLATE AND METHACRYLATE ESTERS

[75] Inventors: Jawad H. Murib; Charles E. Frank; Ben Seeskin, all of Cincinnati, Ohio

[73] Assignee: National Distillers and Chemical Corporation, New York, N.Y.

[22] Filed: Nov. 10, 1971

[21] Appl. No.: 197,523

Related U.S. Application Data

[63] Continuation-in-part of Ser. No. 99,251, Dec. 17, 1970, abandoned.

[52] U.S. Cl...... 260/486 R, 260/497 A, 260/533 N, 260/533 R, 260/597 B, 260/604 R
[51] Int. Cl............................................. C07c 69/54
[58] Field of Search ................................. 260/486 R

[56] References Cited
FOREIGN PATENTS OR APPLICATIONS
42/5222  3/1967  Japan............................. 260/486 R Primary Examiner—Lorraine A. Weinberger
Assistant Examiner—Paul J. Killos
Attorney—Allen A. Meyer

[57]          ABSTRACT

Process for the preparation of acrylate or methacrylate esters involving the reaction of propylene or isobutylene with a primary alcohol and molecular oxygen in the vapor phase at temperatures of up to 250° C. and in the presence of a catalyst composition containing phosphoric acid and a catalytically effective amount of palladium metal. The acrylate or methacrylate esters are selectively produced in the single step vapor phase oxidation.

12 Claims, No Drawings

PROCESS FOR THE PREPARATION OF ACRYLATE AND METHACRYLATE ESTERS

RELATED APPLICATION

This application is a continuation-in-part of U.S. application, Ser. No. 99,251, filed Dec. 17, 1970 and now abandoned.

BACKGROUND OF THE INVENTION

1. Field of the Invention

The present invention relates to a process for the preparation of acrylate and methacrylate esters from unsaturated organic compounds. More particularly, it relates to a process for the preparation of such materials by the catalytic oxidation of propylene or isobutylene, respectively, with molecular oxygen in the presence of primary lower aliphatic alcohols.

In recent years, there has been an increased demand for acrylic and methacrylic esters in a variety of fields, for example, in the preparation of polymers and/or resins from such monomers. Acrylic esters, for example, have been employed in the synthesis of a wide variety of acrylic fibers and in the development of new applications such as acrylic emulsions and improved thermosetting acrylic paints.

While the present process is applicable to the synthesis of both the acrylates and methacrylates of the primary lower aliphatic alcohols, it will be principally discussed and illustrated in terms of the preparation of the acrylic esters, in particular methyacrylate. It should, however, be understood that the process of the present invention comprehends the synthesis of the several lower aliphatic esters of both acrylic and methacrylic acids, as indicated above and as set forth in the claims appended hereto.

2. Description of the Prior Art

At the present time, acrylic esters may be produced by the Reppe process (involving the reaction of acetylene with carbon monoxide and alcohol in the presence of a nickel carbonyl complex), by the hydrolysis of acrylonitrile, by the so-called ketene process (involving the decomposition of acetic acid), and by the multi-step vapor phase oxidation of propylene. See Japan Chemical Quarterly, vol. 5, No. 3, pages 12–16 (1969).

The Reppe process involves the reaction of acetylene, carbon monoxide and alcohol in the presence of nickel carbonyl complex:

1. $CH \equiv CH + ROH + CO \xrightarrow{Ni(CO)_4} CH_2=CHCOOR$

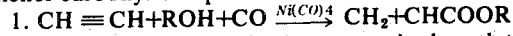

A major disadvantage of this process is the relatively high cost of the starting materials, acetylene and carbon monoxide. The catalyst, nickel carbonyl, is a highly toxic and corrosive material. The carbon monoxide, the main raw material, is also toxic. An additional disadvantage is the need to carry out the process at high pressures, requiring complex and expensive processing equipment.

The hydrolysis of acrylonitrile is carried out in the liquid phase in accordance with the following reactions:

2. $CH_2=CH-CN + H_2O + H_2SO_4 \longrightarrow CH_2=CHCONH_2 \cdot H_2SO_4$

3. $CH_2=CHCONH_2 \cdot H_2SO_4 + ROH \longrightarrow CH_2=CHCOOR + (NH_4)HSO_4$ Although this technique utilizes less complicated process equipment, the high cost of acrylonitrile and the requirement of one mole of sulfuric acid per mole of product increase the manufacturing cost and make this process relatively uneconomical.

The ketene process, using acetic acid as the primary raw material, involves the following complex reaction sequence:

4. $CH_3COOH \longrightarrow CH_2=C=O + H_2O$

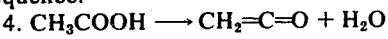

(5) 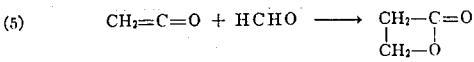

$$CH_2=C=O + HCHO \longrightarrow \begin{array}{c} CH_2-C=O \\ | \quad\quad | \\ CH_2-O \end{array}$$

(6) 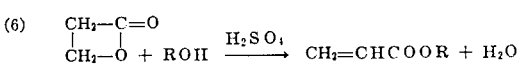

$$\begin{array}{c} CH_2-C=O \\ | \quad\quad | \\ CH_2-O \end{array} + ROH \xrightarrow{H_2SO_4} CH_2=CHCOOR + H_2O$$

This process also utilizes expensive raw materials, i.e., acetic acid and formaldehyde. Moreover, such process is inefficient in the production of both ketene and propiolactone intermediates. Industrial production of acrylic esters employing this technique is therefore restricted by both operational and cost requirements.

A recently described process which may be utilized for the preparation of acrylic acid esters involves a multi-step procedure for the vapor phase oxidation of propylene into first acrolein and then acrylic acid, followed by esterification of the latter material to the desired acrylate. In such process the acrolein must be initially separated prior to further oxidation to acrylic acid, and the acid thereafter esterified in a separate operation. The requisite multi-step operations obviously present processing problems. Moreover, the acrylic acid formed initially and thereafter reacted in the successive reaction zones is subject to autoxidation, resulting in relatively low product yields.

It is, accordingly, among the objects of the present invention to provide an improved process for the selective preparation of acrylic and methacrylic esters in substantial conversions. Other objects and advantages of the invention will be apparent from consideration of the following detailed description of preferred forms thereof.

SUMMARY OF THE INVENTION

In accordance with the present invention, propylene or isobutylene is reacted in the vapor phase with a primary lower aliphatic alcohol, i.e., an alcohol having from one to four carbon atoms, and atmospheric oxygen, at temperatures of up to 250° C. and in the presence of a catalyst composition containing a phosphoric acid and a catalytically effective amount of palladium metal, to selectively form the corresponding acrylic or methacrylic acid ester. The process is carried out at elevated temperatures, employing a heterogeneous catalyst contact system, e.g., a system utilizing a fixed, moving or fluidizied catalyst bed. The reactions carried out in the process may be illustrated by the following equations:

(7) $CH_2=CH-CH_3 + 1.5O_2 + R_1OH \xrightarrow[Pd]{H_3PO_4} CH_2=CH-COOR_1 + 2H_2O$

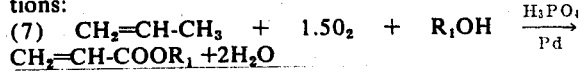

(8)

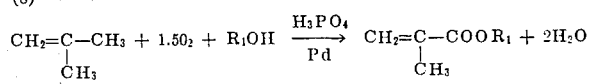

$$CH_2=C-CH_3 + 1.5O_2 + R_1OH \xrightarrow[Pd]{H_3PO_4} CH_2=C-COOR_1 + 2H_2O$$
$$\phantom{CH_2=}|\phantom{C-CH_3 + 1.5O_2 + R_1OH \xrightarrow[Pd]{H_3PO_4} CH_2=}|$$
$$\phantom{CH_2=}CH_3 \phantom{-CH_3 + 1.5O_2 + R_1OH \xrightarrow[Pd]{H_3PO_4} CH_2=C-}CH_3$$

wherein $R_1$ is primary lower alkyl, viz., methyl, ethyl, n-propyl, or n-butyl.

It has been found that use of the indicated procedure facilitates the selective formation of the desired acrylates or methacrylates with markedly improved conversions. It was, in fact, surprising that propylene and isobutylene even react with the primary lower aliphatic alcohols to form the corresponding esters in view of the known facility with which such alcohols, e.g., methanol, are oxidized to the corresponding aldehydes, e.g., formaldehyde.

Moreover, the direct vapor phase process of the invention may be readily applied commercially. Carrying out the reaction in the vapor phase is a relatively simple and efficient operation, since no moving parts are required in the processing equipment. Product separation is also simplified, since the reaction products can be separated from the reaction mixture by azeotropic or extractive distillation, or by solvent extraction. Further, gas phase reactions generally permit continuous operation and do not necessitate the use of expensive, volatile solvents.

DESCRIPTION OF THE PREFERRED EMBODIMENTS

In accordance herewith, propylene or isobutylene is reacted with molecular oxygen and the respective primary lower aliphatic alcohols, $R_1OH$. The reaction of higher alcohols, e.g., those having more than four carbon atoms, results in increased side reactions and, consequently, decreases the selectivity of formation of the desired esters. Preferably, the selective oxidation process hereof is employed in the reaction of propylene with atmospheric oxygen and methanol to form methyl acrylate or, alternatively in the reaction of isobutylene with atmospheric oxygen and methanol to form methyl methacrylate.

The propylene or isobutylene reacted in the process may be fed in pure form or, alternatively, may be impure in the sense that it may contain minor amounts, e.g., up to about 50 mole percent thereof, of a saturated hydrocarbon vapor such as methane, ethane or propane gas. The oxygen feed may similarly be pure oxygen gas or, alternatively, an oxygen-containing gas mixture such as air or air enriched with oxygen. In addition to these materials, the gaseous feed mixture reacted in the process may contain other inert diluents such as water vapor, carbon dioxide, nitrogen, acetic acid or acrylic acid, as well as other reactive diluents such as acrolein.

The gaseous reaction mixture is contacted with a supported catalyst composition containing phosphoric acid and a catalytically effective amount of palladium metal, suitably supported on a conventional catalyst carrier such, for example, as silica, alumina, titania, carborundum, carbon, an ion exchange resin or the like. The supports are impregnated or loaded with the phosphoric acid, and the palladium metal, whether alone or admixed, alloyed, or in solid solution with a minor amount of a further metal (e.g., another Group VIII metal, or a Group IB metal, such as silver or gold) is deposited on the support. As indicated below, the catalytically effective palladium metal and the phosphoric acid may be deposited on or impregnated in the catalyst carrier in any desired sequence, the combined supported catalyst composition, however, formed, being active in the present vapor phase process.

The palladium metal is incorporated in amounts of from about 0.01 to 5 percent, preferably from about 0.1 to 2 percent, by weight of the total catalyst composition. The phosphoric acid is incorporated in amounts of at least about 1 percent and up to as much as about 50 percent by weight of the total catalyst composition, preferably from about 5 to 30 percent by weight thereof.

It has been found, in accordance with the present invention, that other catalyst compositions, e.g., palladium metal-containing catalyst compositions which do not incorporate phosphoric acid, or catalyst compositions containing noble metals, other than palladium, either with or without phosphoric acid, e.g., platinum, are not effective in the present process.

Deposition of the catalytically effective amount of palladium metal utilized in this process may be effected by conventional techniques, such as contacting the catalyst support with a solution of a suitable palladium salt or complex, e.g., palladium chloride, palladium acetate, palladium nitrate or palladium acetylacetonate, and thereafter reducing the palladium compound to the metal with hydrogen or other appropriate reducing agent. Alternatively, the salt may, if desired, be reacted with alkali to form the corresponding palladium oxide, and the latter thereafter reduced to the catalytically active metal.

When the palladium metal is deposited prior to impregnation of the support with phosphoric acid, the palladium salt may be applied from either aqueous or organic media, e.g., water or organic solvents such as lower alkanols, e.g., methanol or ethanol, benzene, chloroform, or the like. When, on the other hand, the catalytically active palladium metal is deposited on the catalyst support after impregnation of the phosphoric acid, the palladium salt is usually applied from an organic solvent. Organic media are preferred for deposition of palladium metal in this alternative embodiment inasmuch as the presence of water may tend to remove a portion of the phosphoric acid from the carrier.

The catalyst carrier may be loaded with the phosphoric acid by impregnating the support with syrupy phosphoric acid, e.g., 85% $H_3PO_4$, and subsequently drying the carrier as, for example, in a vacuum oven. The impregnated support may thereafter be calcined to improve bonding of the phosphoric acid impregnant to the carrier. Alternatively, in lieu of the preferred vapor phase operations of this invention, the phosphoric acid may be added continuously to the reaction mixture in the form of an aqueous solution to maintain a trickle liquid phase over the catalyst bed. In this case, the phosphoric acid in the effluent mixture may be recovered and recycled.

Commercially available catalyst materials may be utilized in the preparation of catalyst compositions hereof. Hence, either a commercial supported palladium metal catalyst may be treated with phosphoric acid or a commercial supported phosphoric acid catalyst may have palladium metal deposited thereon, to form the catalyst.

Stoichiometric proportions of the olefin, alcohol and oxygen reactants, viz., 1 mole of each of the olefin and alcohol per 1.5 mole of the oxygen, may be utilized in the vapor phase process of this invention. On the other hand, it may be preferred to use reaction mixtures in which either the oxygen or the olefin is the limiting reactant. Generally, reaction mixtures are employed in which oxygen is incorporated in amounts of from about 5 to 45 mole percent, in admixture with from about 25 to 90 mole percent of the olefin and from about 5 to 60 mole percent of the alcohol reactant. In the case of trickle phase operation, the molar ratio of water to olefin may range between 0.1–10 to 1.0. Obviously, when inert diluents are present in the reaction mixture, e.g., when the oxygen is added in the form of air, the proportions of the several reactants are correspondingly changed. Thus, propylene may be present in amounts of as low as 5 mole percent when the oxygen is introduced as air.

The vapor phase reaction is carried out by passing the gaseous reaction mixture of the olefin, alcohol and oxygen reactants into contact with the palladium metal-phosphoric acid-containing catalyst. The gaseous mixture may be formed by bubbling the gaseous olefin and/or oxygen streams through the liquid alcohol. Alternatively, the alcohol may be separately vaporized, as by flashing, and metered into the reaction zone.

The process is carried out at temperatures markedly lower than those which have, heretofore, been generally regarded as necessary for vapor phase olefin oxidation reactions. It has previously been proposed to conduct such reactions at temperatures of the order of about 350° to 400° C., at which levels substantial combustion of the olefin reactant occurs. Surprisingly, however, it has been found that selective formation of acrylate and methacrylate esters is obtained in accordance with this invention at substantially lower temperatures. Thus, the esters may be obtained at temperatures as low as 50°, to 200° C. or higher.

The reaction temperature employed in the process varies inversely with the contact time employed, it being possible to use higher reaction temperatures when employing shorter contact times and, conversely, lower reaction temperatures at longer contact times. It has thus been found possible to carry out the process of the invention at temperatures of as high as 250° C., using relatively short contact times.

The oxidation process is conducted at atmospheric or elevated pressures, the use of higher pressures somewhat increasing product conversions. The disclosed operations may thus be effected at pressures of up to about 300 psi. It is, however, generally preferred to carry out the process under pressures only slightly in excess of atmospheric, e.g., up to about 75 psi, to increase productivity and catalyst efficiency.

After the gaseous reaction mixture contacts the catalyst composition, the exhaust gases are cooled and scrubbed to facilitate recovery of the acrylate or methacrylate ester. The desired product is thereafter separated by any convenient means, for example, by azeotropic distillation. Unreacted feed materials separated from the reaction effluent may be recovered and recycled for further reaction.

The following examples are directed to preferred embodiments of the vapor phase process hereof. In the examples, which are intended as illustrative and which should not be construed in a limiting sense, all parts and percentages are given by weight and temperatures in degrees Centigrade unless otherwise specified.

As employed herein, the conversions to particular acrylate or methacrylate products, and the selectivities of formation of such products, are defined as follows:

Percent Conversion
$$= \frac{\text{Number of Moles of Product Formed}}{\substack{\text{Number of Moles of Product} \\ \text{Theoretically Produced Based on} \\ \text{Limiting Reactant}}} \times 100$$

Percent Selectivity
$$= \frac{\text{Number of Moles of Final Product}}{\text{Number of Moles of Olefin Reacted}} \times 100$$

The proportions of palladium metal and phosphoric acid in the catalyst compositions described above, or identified in the ensuing examples, are given as percentages of the total weight of the supported catalyst compositions, including both the support and the phosphoric acid and palladium metal components thereof, unless otherwise specified.

EXAMPLE 1

Preparation of Methyl Acrylate Employing a Palladium-Phosphoric Acid Catalyst Composition A pyrex glass reactor 12 × 2.5 cm (outside diameter), provided with a thermowell, (0.8 cm O.D.), extending the entire length of the reactor, is attached to a preheating zone (1.2 × 15 cm) and a capillary exit tube (0.1 × 10 cm) to permit rapid quenching. The reactor is packed with 20 grams of 2 percent palladium on alumina. The catalyst composition is prepared by treating 20 grams of 2 percent palladium supported on alumina with 2 grams of phosphoric acid dissolved in 10 ml. of water, followed by heating in an open, rotating, evaporating dish with a heat gun, delivering hot air at 125° C. to remove unbound water. The dried catalyst material is cooled to room temperature, packed in the reactor and heated at 130° C.

A gaseous mixture of 31.2 millimoles/hr (mmoles/hr) of propylene and 26.4 mmoles/hr of oxygen is bubbled through liquid methanol heated at 40° C. and the mixed vapors from the methanol bubbler are fed into the heated catalyst composition. The exhausted reaction gases are passed through a trap held at −40° C.

Analysis by gas chromatography and mass spectral analysis of the condensate indicates the formation of 3.70 mmoles/hr methyl acrylate, 1.85 mmoles/hr acrylic acid and 0.80 mmoles/hr acrolein. The conversion to methyl acrylate based on the oxygen feed [the limiting reactant in Equation (7)] is 21 percent and the selectivity of formation of methyl acrylate is 41 percent. Upon analysis for carbon dioxide in the effluent stream, it is found that only 14.7 percent of the oxygen feed is converted to carbon dioxide.

CONTROL A

Reaction of Propylene, Methanol and Oxygen, Employing Palladium Metal Alone as the Catalyst Composition For purposes of comparison, Example 1 is repeated employ 24.1 grams of 2 percent palladium on alumina spheres (no phosphoric acid loading) as the catalyst composition. Analysis indicates the formation of 0.028 mmoles/hr methyl acrylate and 16.87 mmoles/hr carbon dioxide. The conversion to methyl acrylate based on the oxygen feed (the limiting reactant in this experiment is only 0.18 percent, with 0.5 percent selectivity. Aproximately 84.7 percent of the oxygen feed is converted to carbon dioxide.

EXAMPLE 2

Preparation of Methyl Acrylate Employing a Palladium-Gold-Phosphoric Acid Catalyst Composition The procedure described in Example 1 is repeated except the catalyst composition is prepared by treating 32 grams of 1.3 percent palladium and 0.55 percent gold, supported on alumina spheres, with 10 ml. of aqueous solution containing 5.1 grams of phosphoric acid. After evaporation of the water, by heating with a heat gun, the catalyst composition is packed in the reactor and heated at 130° C. A gaseous stream consisting of 29.4 mmoles/hr of oxygen and 29.4 mmoles/hr of propylene, is bubbled through liquid methanol held at 40° C. and the mixed vapors are fed into the heated catalyst.

Analysis of the condensate indicates formation of 4.6 mmoles/hr of methyl acrylate and 0.15 mmoles/hr of acrylic acid. The conversion to methyl acrylate is 23.4 percent based on the oxygen feed per pass. The selectivity to methyl acrylate is 60.5 percent based on the propylene reacted. The by-products are small amounts of acrolein and methyl propionate and traces of propionic acid, acetone and methyl formate. Upon analysis for carbon dioxide in the non-condensible gases, it is found that the conversion of the propylene to carbon dioxide and water by combustion is only 3.4 percent.

CONTROL B

Reaction of Propylene, Methanol and Oxygen, Employing Palladium-Gold Alone As The Catalyst Composition The procedure described in Example 2 is repeated, employing 32 grams of the indicated palladium-gold catalyst composition which is not, however, impregnated with phosphoric acid. Analysis indicates the formation of 0.2 mmoles/hr of methyl acrylate. The conversion to such material, based upon the oxygen limiting reactant, is only 1.1 percent, some 21.6 percent of the propylene reacted being burned to carbon dioxide and water.

EXAMPLE 3

Preparation of Methyl Acrylate Employing a Palladium-Silver-Phosphoric Acid Catalyst Composition The procedure described in Example 1 is repeated except that the catalyst composition consists of 2 percent palladium, 0.05 percent silver and 2 percent phosphoric acid supported on alumina. Analysis of the condensate indicates formation of methyl acrylate with a conversion of 12.7 percent based on the oxygen feed, and a selectivity of 26.5 percent. The condensible by-products are acrolein, allyl acetate and methyl propionate.

EXAMPLE 4

Preparation of Ethyl Acrylate Employing a Palladium-Gold-Phosphoric Acid Catalyst Composition The procedure of Example 2 is repeated using the same catalyst system heated at 125° C. A gaseous stream consisting of 29.2 mmoles/hr of propylene and 19.4 mmoles/hr of oxygen is bubbled into liquid ethanol heated at 40° C, delivering 10.1 mmoles/hr of ethanol vapor. The mixed vapors are then fed into the heated catalyst. The reaction products are trapped at −20° C. Analysis of the condensate shows formation of ethyl acrylate at a rate of 2.25 mmoles/hr with a conversion of 22.3 percent based on the ethanol (limiting reactant) feed per pass.

EXAMPLE 5

Preparation of Propyl Acrylate Employing a Palladium-Gold-Phosphoric Acid Catalyst Composition The procedure of Example 4 is repeated using the same catalyst system heated at 125° C. except that n-propyl alcohol is used instead of ethanol. A feed consisting of 34.8 mmoles/hr of propylene and 23.0 mmoles/hr of oxygen is bubbled through liquid n-propanol heated at 70° C., delivering 20.6 mmoles/hr of n-propanol. The mixed vapors are fed into the heated catalyst composition and the reaction products condensed at 0° C. Analysis of the condensate shows formation of n-propyl acrylate at a rate of 1.8 mmoles/hr with conversion of 11.7 percent based on the oxygen feed per pass.

EXAMPLE 6

Preparation of Methyl Methacrylate Employing a Palladium-Phosphoric Acid Catalyst Composition The procedure of Example 1 is repeated using the same catalyst system heated at 130° C except that isobutylene is used instead of propylene. A feed, consisting of 24.8 mmoles/hr of isobutylene and 25.2 mmoles/hr of oxygen is allowed to bubble through liquid methanol heated at 40° C. The mixed vapors are fed into the heated reactor and the reaction products trapped at 0°C. The condensate contains methyl methacrylate in amounts corresponding to a formation rate of 2.5 mmoles/hr with a conversion of 15.1 percent based on the oxygen (limiting reactant) fed per pass.

CONTROL C

Reaction of Propylene, Methanol and Oxygen, Employing Platinum-Phosphoric Acid as the Catalyst The procedure of Example 1 is repeated, employing 26 grams of a catalyst composition containing 0.32 percent platinum and 9.1 percent phosphoric acid supported on alumina spheres. The feed consists of 29.2 mmoles/hr methanol, 28.88 mmoles/hr oxygen and 28.8 mmoles/hr propylene. Analysis of the condensate indicates extensive combustion of the propylene reactant to carbon dioxide and water.

CONTROL D

Reaction of Propylene, Methanol and Oxygen, Employing Platinum Alone as the Catalyst When the experiment of Control C is repeated, employing 23.6 grams of a catalyst composition containing 0.35 percent platinum on alumina which has not been treated with phosphoric acid, the reactor effluent is found to be devoid of any acrylic compounds.

EXAMPLE 7

Preparation of Methyl Acrylate, Employing a Palladium-Phosphoric Acid on Silica Catalyst Composition The procedure of Example 1 is repeated except that the catalyst consists of 12.58 grams of 1.74 percent palladium and 13.2 percent phosphoric acid supported on ⅛ inch silica pellets. A stream of propylene and air containing 36.3 mmoles/hr oxygen and 42.2 mmoles/hr propylene is bubbled through liquid methanol heated at 45° C. The mixed vapors are passed through the catalyst heated at 150° C. Analysis of the condensate shows formation of 1.83 mmoles/hr of methyl acrylate, 0.8 mmoles of acrylic acid and 1.67 mmoles of acrolein.

The conversion to methyl acrylate is 7.6 percent, based on the oxygen feed.

The conversion and selectivity data obtained in the preceding experiments is tabulated below. It will be noted from the tabulated data that the reaction of the olefinic and primary lower aliphatic alcohol reactants in the presence of a catalyst composition containing phosphoric acid and a catalytically effective amount of palladium facilitates their improved selective conversion to the corresponding acrylate or methacrylate.

Calculated Conversions and Selectivities in Examples

|  | Reactants* | Catalyst | % Conversion to Acrylate Per Pass | % Selectivity of Acrylate Formation |
|---|---|---|---|---|
| Ex. 1 | Methanol | Pd-H$_3$PO$_4$ | 21 | 41 |
| Control A | do. | Pd | 0.18 | 0.5 |
| Ex. 2 | do. | Pd-Au-H$_3$PO$_4$ | 23.4 | 60.6 |
| Control B | do. | Pd-Au | 1.1 | — |
| Ex. 3 | do. | Pd-Ag-H$_3$PO$_4$ | 12.7 | 26.5 |
| Ex. 4 | Ethanol | Pd-Au-H$_3$PO$_4$ | 22.3 | — |
| Ex. 5 | Propanol | Pd-Au-H$_3$PO$_4$ | 11.7 | — |
| Ex. 6 | Methanol | Pd-Au-H$_3$PO$_4$ | 15.1 | — |
| Control C | do. | Pt-H$_3$PO$_4$ | Extensive Combustion to CO$_2$ and H$_2$O | |
| Control D | do. | Pt | None | |
| Ex. 7 | do. | Pd-H$_3$PO$_4$ | 7.6 | |

* In the experiments other than Example 6, propylene is reacted with the designated alcohol and molecular oxygen. In Example 6, isobutylene is employed as the olefinic reactant in place of propylene, and the conversion to methyl methacrylate formation calculated.

As is evident from the preceding examples, the present invention provides an improved process for the production of acrylate and methacrylate esters by the vapor phase oxidation of propylene and isobutylene, respectively. It should be understood that various modifications may be made in such preferred embodiments of the process without departing from the scope of the invention.

We claim:

1. A process for the preparation of acrylate or methacrylate esters of primary lower aliphatic alcohols, which comprises reacting propylene or isobutylene in the vapor phase with such an alcohol and with molecular oxygen in the presence of a catalyst composition comprising phosphoric acid and a catalytically effective amount of a material selected from the group consisting of palladium metal, and an alloy, mixture or solid solution of palladium metal with a Group VIII or Group IB metal.

2. The process of claim 1, wherein said alcohol is methanol, ethanol, n-propanol, or butanol.

3. The process of claim 1, wherein said catalyst composition is a supported catalyst material having phosphoric acid impregnated therein.

4. The process of claim 1, wherein said catalyst composition incorporates palladium metal in an amount of from 0.01 to 5 percent and phosphoric acid in an amount of from 1 to 50 percent by weight thereof.

5. The process of claim 1, wherein the reaction is carried out at temperatures of up to 250° C. and under pressures of from atmospheric up to 300 psi.

6. The process of claim 1, wherein the respective materials are reacted in proportions of from 5 to 60 mole percent of the primary lower aliphatic alcohol, from 5 to 90 mole percent of propylene or isobutylene, and from 5 to 45 mole percent of the molecular oxygen.

7. The process of claim 1, in which propylene is reacted with methanol to produce methyl acrylate.

8. The process of claim 1, in which propylene is reacted with ethanol to produce ethyl acrylate.

9. The process of claim 1, in which isobutylene is reacted with methanol to produce methyl methacrylate.

10. A process for the preparation of acrylate or methacrylate esters of primary lower aliphatic alcohols which comprises contacting a gaseous reaction mixture of propylene or isobutylene, a primary lower aliphatic alcohol having from one to four carbon atoms and molecular oxygen with a catalyst composition comprising 1 to 50 percent by weight phosphoric acid and 0.01 to 5 percent by weight palladium metal on a carrier, and reacting such mixture in contact with the catalyst composition at temperatures below 250° C. and under pressures of from atmospheric up to 300 psi to produce said acrylate or methacrylate esters.

11. The process of claim 10, in which methanol is reacted with propylene or isobutylene to produce methyl acrylate or methyl methacrylate, respectively.

12. The process of claim 10, in which the gaseous reaction mixture comprises from 5 to 90 mole percent propylene or isobutylene, from 5 to 60 mole percent alcohol, and from 5 to 45 mole percent oxygen.

* * * * *